United States Patent [19]

Thompson et al.

[11] Patent Number: 5,069,162
[45] Date of Patent: Dec. 3, 1991

[54] TEAT CUP INFLATION

[75] Inventors: Paul D. Thompson; Gary C. Steingraber, both of Madison, Wis.

[73] Assignee: DEC International, Inc., Madison, Wis.

[21] Appl. No.: 527,614

[22] Filed: May 23, 1990

[51] Int. Cl.$^5$ .............................................. A01J 5/00
[52] U.S. Cl. .................................................. 119/14.47
[58] Field of Search ............... 119/14.47, 14.48, 14.49, 119/14.50, 14.51, 14.52, 14.53

[56] References Cited

FOREIGN PATENT DOCUMENTS

| 1199604 | 1/1986 | Canada | 119/14.47 |
| 897178 | 1/1982 | U.S.S.R. | 119/14.47 |
| 1253531 | 8/1986 | U.S.S.R. | 119/14.47 |

Primary Examiner—Gene Mancene
Assistant Examiner—R. Thomas Price
Attorney, Agent, or Firm—Paul R. Puerner

[57] ABSTRACT

A new teat cup inflation comprises a flexible tubular member having upper and lower barrels and a mouthpiece chamber. The walls of the upper and lower barrels are formed as continuous bands of alternating internal and external flutes. The lower end of the lower barrel is formed with an external projection that is received in a groove in a teat cup shell. The wall of the inflation upper barrel diverges from the lower barrel toward the mouthpiece chamber. The wall of a portion of the mouthpiece chamber is fluted on the interior and has a frusto-conical surface on the exterior. The mouthpiece chamber further has a band portion that receives a retaining ring for assembling the inflation in the teat cup without tools and without stressing the inflation mouthpiece after assembly. The new inflation provides better control for teat penetration for improved milk-out.

18 Claims, 1 Drawing Sheet

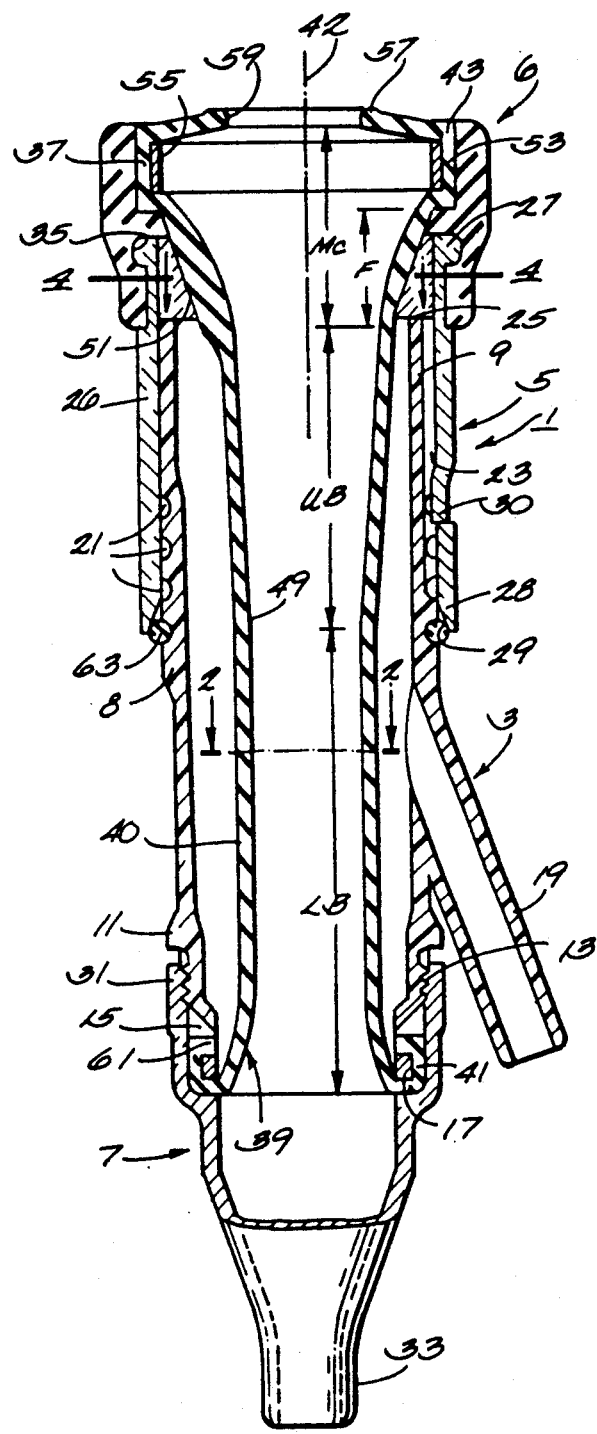
Fig. 1
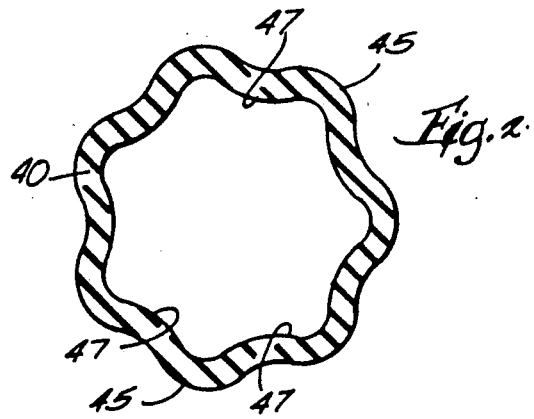
Fig. 2
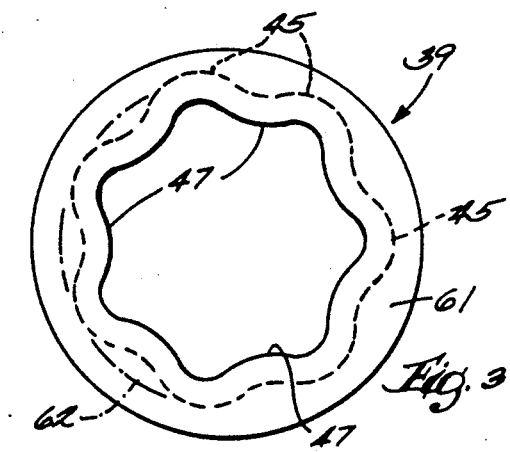
Fig. 3
Fig. 4

TEAT CUP INFLATION

BACKGROUND OF THE INVENTION

1. Field of the Invention

This invention pertains to dairy equipment, and more particularly to apparatus for milking dairy cows.

2. Description of the Prior Art

Various equipment has been developed to assist dairymen increase the efficiency of their operations. For example, machines for milking cows are well known.

A vital component of modern milking machines is the teat cup, which fits over the cow's teat during milking. The teat cup includes a hollow flexible inflation that contacts the teat. Under the action of a vacuum system, the inflation massages the teat to maintain circulation while vacuum expresses milk from the cow into a milk line.

An example of a prior teat cup inflation may be seen in U.S. Pat. No. 4,530,307. The inflation of the U.S. Pat. No. 4,530,307, is designed with flutes that produce a uniform distribution of forces around the cow's teat. The inflation provides uniform massaging without pinching the teat, and it accommodates a variety of teat sizes and shapes. Because of its beneficial qualities, the inflation of the U.S. Pat. No. 4,530,307 has enjoyed considerable commercial success.

Nevertheless, ongoing research and development indicates that further improvements in inflations are desirable.

SUMMARY OF THE INVENTION

In accordance with the present invention, a new teat cup inflation is provided that surpasses the performance of prior inflations. This is accomplished by incorporating a series of design improvements into the inflation mouthpiece chamber and barrels.

One of the design improvements is that the mouthpiece chamber contains flutes only on its interior surface, with the corresponding exterior surface being formed as a frusto-conical surface. That combination of geometries results in an unusually rigid and stable construction for the mouthpiece chamber. The improved design prevents the flutes at the mouthpiece chamber from unfolding in use, which would allow excessive teat penetration into the inflation and prevent complete milkout of the cow.

Additional inflation improvements include a taper in the upper barrel adjacent the mouthpiece chamber. The tapered upper barrel contributes to better control of teat penetration into the inflation and thus better milkout.

It is a feature of the present invention that the mouthpiece chamber is preformed for a ring that retains the inflation to the teat cup. That design allows the inflation to be inserted into the teat cup in an unstressed condition and without the use of any tools.

Further in accordance with the present invention, the lower end of the inflation lower barrel is formed with an annular projection that extends beyond the envelope of the barrel external flutes. The projection mates with a groove in the teat cup to hold the inflation in place during assembly of the various teat cup components prior to use in the milking operation.

Other advantages, benefits, and features of the present invention will become apparent to those skilled in the art upon reading the detailed description of the invention.

BRIEF DESCRIPTION OF THE DRAWINGS

FIG. 1 is a longitudinal cross-sectional view of the inflation of the present invention inserted into a teat cup.

FIG. 2 is an enlarged cross-sectional view taken along lines 2—2 of FIG. 1.

FIG. 3 is an enlarged view of the lower end of the inflation in an unassembled condition.

FIG. 4 is an enlarged cross-sectional view taken along lines 4—4 of FIG. 1.

DETAILED DESCRIPTION OF THE INVENTION

Referring to FIG. 1, a teat cup 1 is illustrated that includes the present invention. The teat cup 1 is particularly useful for placing over a teat of a cow's udder for milking the cow by machine.

The teat cup 1 comprises a central shell 3, an upper shell 5, a retainer 6, and an end cap 7. The central shell 3 is generally shaped as a tubular cylinder having a wall 8 with an upper section 9 and a lower section 11. The central shell lower section 11 has external threads 13 and an external groove 15 located between the threads 13 and the central shell lower end 17. The central shell further comprises a vacuum tube 19 that is joined to and opens into the interior of the tubular wall 8. The wall 8 defines a series of external annular grooves 21 in the upper section 9 and a keyway 23 that extends from the shell upper end 25 to the grooves 21.

The upper shell 5 is a hollow cylinder having a wall 26 and an annular flange 27 extending radially from its upper end. The lower end 28 of the upper shell is formed with an internal chamfer 29. The upper shell cylinder wall 26 also has an inwardly projecting lug 30 between the flange 27 and the lower end 28.

The teat cup end cap 7 has an upper end with internal threads that mate with the central shell threads 13. The cap lower end is formed with a connection tip 33. The central shell 3 and the cap 7 are fabricated from a transparent plastic. The upper shell 5 is fabricated from stainless steel.

The retainer 6 is preferably manufactured from a molded rubber material. The retainer has a first internal groove 35 that conforms to the flange 27 of the upper shell 5. The retainer also has a second internal groove 37.

In accordance with the present invention, the improved inflation 39 is inserted into the teat cup 1 for providing increased performance to a milking machine system. The inflation 39 is fabricated generally as an elongated tubular member having a wall 40 that is concentric about a longitudinal axis 42. The inflation is divided into a lower barrel LB, and upper barrel UB, and a mouthpiece chamber MC.

Looking also at FIG. 2, the inflation lower barrel LB extends from the inflation lower end 39 to approximately the longitudinal midpoint 49. The inflation wall 40 of the lower barrel is formed with a cross-section in the form of a continuous band of alternating and parallel external flutes 45 and internal flutes 47. In its unassembled condition, the lower barrel cross-section is substantially constant, and the flutes 45 and 47 are parallel to the axis 42.

The portion of the inflation 40 between the midpoint 49 thereof and the inflation upper end 43 is divided into the upper barrel UB and the mouthpiece chamber MC. For the length of the upper barrel, the wall 40 is defined by flutes 45 and 47 that are continuations of the respective flutes on the inflation lower barrel LB. However, the wall 40 of the upper barrel gradually diverges toward the inflation upper end 43 so as to impart a taper to the upper barrel.

From its junction with the upper barrel UB, the wall 40 of the inflation mouthpiece chamber MC continues to diverge toward the inflation upper end 43. In addition, the cross-section of the wall at the mouthpiece chamber is different than at the upper barrel and at the lower barrel LB. As further shown in FIG. 4, the inflation wall for a length F of the mouthpiece chamber is fabricated only with internal flutes 47. The corresponding exterior surface of the inflation wall is formed without exterior flutes but rather as a frusto-conical surface 51.

From the upper end of the length F of the mouthpiece chamber MC, the inflation wall 40 blends into an annular band 53 of material. The band 53 defines an inner diameter sized to the same dimension as the outer diameter of a retaining ring 55 plus a band of metal 53. A washer-like mouthpiece 57 having an internal surface 59 connects to the mouthpiece chamber band 53.

Further in accordance with the present invention, the inflation lower end 41 is formed with an outwardly extending annular projection 61. Also see FIG. 3. The outer diameter of the projection 61 is larger than the envelope 62 of the inflation external flutes 45.

The inflation 39 is made from a flexible elastomer. While silicon rubber is a preferred material, other elastomers are also acceptable. A thickness of approximately 0.08 inches for the inflation wall 40 works very well.

To assemble and use the teat cup 1, the retainer 6 is pressed onto the upper shell 5 such that the upper shell flange 27 engages the first groove 35 of the retainer. The retaining ring 55 is installed in the inner diameter of the inflation band 53. The fact that the inflation band is pre-sized to the outer diameter of the retaining ring 55 eliminates the requirement of a special tool for installing the retaining ring, as was necessary with prior inflations. Then the upper shell 5 is pushed onto the central shell, with the upper shell lug 30 engaging the central shell keyway 23. Then the inflation lower end 41 is inserted through the assembled upper shell and retainer, and the inflation mouthpiece chamber band 53 is seated in the retainer second groove 37. The lower end 41 of the inflation 39 is folded outwardly to curl around the lower end 17 of the central shell 3. The inflation projection 61 is designed to fit within the groove 15 near the lower end of the central shell. The cap 7 is screwed onto the central shell by means of the threads 13 on the central shell and cooperating internal threads on the cap.

The upper shell is pushed up the central shell, stretching the inflation, and the sealing ring 63 is installed in a selected groove 21 of the central shell 3.

In operation, a flexible hose, not shown, is connected to the teat cup tip 33, and a steady vacuum is applied to the hose. The mouthpiece internal surface 59 of the inflation 39 is slipped over a cow's teat such that the teat enters the mouthpiece chamber MC and upper barrel UB. The vacuum induced in the interior of the inflation through the tip 33 causes atmospheric pressure to collapse the inflation upper barrel slightly around the teat to hold the inflation and thus the teat cup in place. A second hose, also not illustrated, is connected to the vacuum tube 19 of the central shell 3. A pulsating vacuum is applied to the vacuum tube 19 and thus to the interior of the central shell 3 and to the exterior of the inflation 39. As a result, the inflation upper barrel UB and lower barrel LB alternately expand and collapse radially about axis 42 in a continuous manner, the vacuum causing the teat to express milk into the interior of the inflation and out the tip 33, and the collapse massaging the teat end, thereby preventing tissue damage which a constant vacuum would produce.

The unique construction of the inflation 39 that combines flutes 45 on the interior and the frusto-conical surface 51 on the exterior of the mouthpiece chamber MC for the length F thereof results in several advantages. The inflation wall 40 is unusually rigid and stable in that region. The wall rigidity prevents the flutes from unfolding and thus increasing the effective diameter of the upper barrel and mouthpiece chamber, which would allow the cow's teat to penetrate further into the inflation than is desirable and thereby prevent complete milkout of the cow. The preformed diameter of the inflation mouthpiece chamber band 53 allows the retaining ring 55 to be installed without tools. Moreover, the preformed inflation band 53 predetermines the diameter of the mouthpiece internal surface 59 for consistency between inflations and also allows the mouthpiece chamber to be in an unstressed condition when the inflation is assembled in the teat cup 1.

The projection 61 on the lower end 41 of the inflation 39 mates with and is held in place in the central shell groove 15. That feature simplifies assembly of the cap 7 to the other teat cup components. Further, of course, the new inflation of the present invention retains all the advantages of prior fluted inflations.

Thus, it is apparent that there has been provided, in accordance with the invention, a new teat cup inflation that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. An inflation comprising a flexible generally tubular member having a longitudinal axis and a wall with first and second ends, the tubular member having a lower barrel adjacent the first end, a mouthpiece chamber adjacent the second end, and an upper barrel intermediate the lower barrel and the mouthpiece chamber, the wall of the tubular member upper and lower barrels being formed as a continuous band of alternating exterior and interior flutes, the exterior flutes lying within an envelope of predetermined diameter, a predetermined length of the wall of the tubular member mouthpiece chamber having flutes on the interior surface thereof.

2. The inflation of claim 1 wherein the wall of the tubular member lower barrel is generally parallel to the longitudinal axis, and wherein the wall of the tubular member upper barrel diverges in the direction of the wall second end to thereby form a taper in the upper barrel.

3. The inflation of claim 1 further comprising a projection extending radially outwardly from the tubular member wall at the first end thereof, the projection having an outer diameter greater than the envelope of the exterior flutes on the tubular member lower barrel.

4. The inflation of claim 1 wherein the inflation is made of a silicon rubber elastomer, and wherein the thickness of the tubular member wall of the upper barrel and the lower barrel is approximately 0.08 inches.

5. The inflation of claim 1 wherein the upper barrel is tapered and in which said tubular member mouthpiece chamber is of a frusto-conical shape.

6. The inflation of claim 1 wherein the exterior surface of said tubular member mouthpiece chamber is of a frusto-conical shape.

7. An inflation for use with a teat cup for milking a cow comprising:
   a. a lower barrel having a generally tubular wall with first and second ends and a longitudinal axis, the tubular wall being formed as a continuous band of alternating interior and exterior flutes, the exterior flutes being bounded by an envelope of a predetermined diameter;
   b. an upper barrel concentric with the lower barrel and having a generally tubular wall with a first end joined to the lower barrel second end and a second end, the upper barrel wall being formed as a continuous band of interior and exterior flutes that are continuations of respective flutes in the lower barrel;
   c. a mouthpiece chamber concentric with the upper barrel and having a generally tubular wall with a first end joined to the upper barrel second end and a second end, a predetermined length of the mouthpiece chamber wall being formed on the interior thereof with flutes that are continuations of respective interior flutes on the upper barrel; and
   d. a mouthpiece concentric with and joined to the second end of the mouthpiece chamber wall.

8. The inflation of claim 7 wherein said tubular member mouthpiece chamber has a frusto-conical surface on the exterior surface thereof.

9. The inflation of claim 7 wherein said upper barrel is tapered outwardly and upwardly.

10. The inflation of claim 7 wherein:
    a. the wall of the lower barrel is parallel to the longitudinal axis; and
    b. the wall of the upper barrel diverges from the first end thereof toward the second end thereof.

11. The inflation of claim 7 wherein the lower barrel is formed with a projection at the first end thereof that extends radially for a distance greater than the diameter of the envelope of the lower barrel external flutes.

12. The inflation of claim 7 wherein the inflation is fabricated from a flexible silicon rubber elastomer, and wherein the walls of the lower barrel and upper barrel are approximately 0.08 inches thick.

13. Apparatus for milking cows comprising:
    a. a teat cup comprising:
       i. a tubular central shell having upper and lower ends and defining an external groove at the lower end;
       ii. a tubular upper shell assembled to the central shell upper end;
       iii. a tubular retainer assembled to the upper shell and having an internal groove of a predetermined diameter; and
       iv. a tubular cap assembled to the central shell lower end;
    b. a flexible inflation inserted into the teat cup comprising:
       i. a generally tubular lower barrel having a longitudinal axis and a wall with a lower end and an upper end, the wall being formed as a continuous band of alternating internal and external flutes, the wall being generally parallel to the longitudinal axis, the lower end extending beyond the teat cup central shell lower end;
       ii. a generally tubular upper barrel concentric with the lower barrel and having a wall with a lower end joined to the lower barrel upper end and an upper end, the upper barrel wall being formed as a continuous band of alternating interior and exterior flutes that blend in continuous fashion into corresponding flutes of the lower barrel;
       iii. a mouthpiece chamber concentric with the upper barrel and having a first wall portion of predetermined length with a lower end that is joined to the upper end of the upper barrel wall and a second end, the mouthpiece chamber first wall portion having an internal surface formed with flutes that are continuations of respective flutes on the upper barrel, the mouthpiece chamber having a second wall portion with a lower end that is joined to the upper end of the first wall portion, the second wall portion defining a band that fits within the teat cup retainer internal groove;
       iv. a mouthpiece joined to the mouthpiece chamber band; and
    c. a retaining ring installed in the internal groove of the mouthpiece chamber band to retain the inflation in the teat cup.

14. The apparatus of claim 13 wherein the mouthpiece chamber band has an internal diameter pre-sized to enable the retaining ring to be installed therein without tools and with the inflation in an unstressed condition after assembly.

15. The apparatus of claim 13 wherein the inflation further comprises projection means extending radially from the external flutes of the lower barrel at the lower end thereof for being received within the groove at the central shell lower end, so that the lower end of the inflation lower barrel is foldable over the central shell lower end and the projection means is received in the groove at the central shell lower end to hold the inflation lower barrel in place in the teat cup.

16. The apparatus of claim 13 wherein the wall of the inflation upper barrel diverges in the direction of the mouthpiece chamber.

17. The apparatus of claim 13 wherein said tubular member mouthpiece chamber has a frusto-conical surface on the exterior surface thereof.

18. The apparatus of claim 13 wherein the lower end of said inflation is seated in said external groove in said lower end of said central shell.

* * * * *